(12) United States Patent
Gogolla et al.

(10) Patent No.: US 9,310,197 B2
(45) Date of Patent: Apr. 12, 2016

(54) MEASURING DEVICE FOR MEASURING DISTANCE

(75) Inventors: Torsten Gogolla, Schaan (LI); Stefan Tiefenthaler, Meiningen (AT); Helmut Seifert, Serba (DE); Gero Schusser, Jena (DE)

(73) Assignee: Hilti Aktiengesellschaft, Schaan (LI)

( * ) Notice: Subject to any disclaimer, the term of this patent is extended or adjusted under 35 U.S.C. 154(b) by 173 days.

(21) Appl. No.: 13/481,396

(22) Filed: May 25, 2012

(65) Prior Publication Data

US 2013/0135604 A1    May 30, 2013

(30) Foreign Application Priority Data

May 26, 2011    (DE) .......................... 10 2011 076 493

(51) Int. Cl.
*G01C 3/08* (2006.01)
*G01S 7/481* (2006.01)
*G01S 7/497* (2006.01)
*G01S 17/08* (2006.01)

(52) U.S. Cl.
CPC ............... *G01C 3/08* (2013.01); *G01S 7/4812* (2013.01); *G01S 7/4813* (2013.01); *G01S 7/4972* (2013.01); *G01S 17/08* (2013.01)

(58) Field of Classification Search
CPC ....... G01C 3/08; G01S 7/4813; G01S 7/4972; G01S 17/08; G01S 7/4812; G01S 7/481; G01J 5/08; G02B 26/10
USPC ........................................................ 356/4.01
See application file for complete search history.

(56) References Cited

U.S. PATENT DOCUMENTS

| 4,154,529 A   | 5/1979 | Dyott |
| 6,781,675 B2 * | 8/2004 | Gogolla et al. ............... 356/4.01 |

(Continued)

FOREIGN PATENT DOCUMENTS

| DE | 102 44 638 A1 | 4/2004 |
| DE | 10 2009 026 618 A1 | 12/2010 |

(Continued)

OTHER PUBLICATIONS

European Search Report, dated Jul. 13, 2012, 4 pages.
U.S. Patent Application, "Measuring Device for Distance Measurement", filed May 25, 2012, Inventor Torsten Gogolla, et al.

*Primary Examiner* — Luke Ratcliffe
*Assistant Examiner* — Vicente Rodriguez
(74) *Attorney, Agent, or Firm* — Crowell & Moring LLP

(57) ABSTRACT

A measuring device and a method for adjusting the measuring device is disclosed. The device includes a first electro-optical component, a second electro-optical component, a beam-shaping optical element, an optics carrier, and a printed circuit board. The optics carrier includes a first receptacle, where the first electro-optical component is mounted in the first receptacle, and a second receptacle, where the beam-shaping optical element is mounted in the second receptacle. The printed circuit board includes a third receptacle, where the second electro-optical component is mounted in the third receptacle. The first electro-optical component and the beam-shaping optical element are adjustable relative to the optics carrier in a direction of a respective optical axis of the first electro-optical component and the beam-shaping optical element and the second electro-optical component is adjustable and fixable in a plane essentially perpendicular to an optical axis of the second electro-optical element.

18 Claims, 4 Drawing Sheets

(56) References Cited

U.S. PATENT DOCUMENTS

| | | |
|---|---|---|
| 7,684,058 B2 * | 3/2010 | Sprenger .................. 356/614 |
| 8,411,257 B2 * | 4/2013 | Dunne ..................... 356/4.01 |
| 2001/0050763 A1 * | 12/2001 | Shirai ....................... 356/5.1 |
| 2004/0051860 A1 | 3/2004 | Honda et al. |
| 2010/0302527 A1 | 12/2010 | Gogolla et al. |
| 2010/0309453 A1 | 12/2010 | Gogolla et al. |

FOREIGN PATENT DOCUMENTS

| | | |
|---|---|---|
| EP | 1 351 070 A1 | 10/2003 |
| EP | 1 752 788 A1 | 2/2007 |
| WO | WO 2004/036145 A1 | 4/2004 |
| WO | WO 2007/017020 A1 | 2/2007 |

* cited by examiner

MEASURING DEVICE FOR MEASURING DISTANCE

This application claims the priority of German Patent Document No. DE 10 2011 076 493.3, filed May 26, 2011, the disclosure of which is expressly incorporated by reference herein.

BACKGROUND AND SUMMARY OF THE INVENTION

The present invention relates to a measuring device for measuring a distance between a reference mark and a target object.

Measuring devices for laser distance measuring systems are made up of an electro-optical component designed as a beam source, a further electro-optical component designed as a detector, transmitting optics and receiving optics. The beam source and the transmitting optics are designated as the transmitting device and the detector and the receiving optics as the receiving device. The beam source emits a laser beam along an optical axis. The laser beam is focused by the transmitting optics and aimed at the target object. A reception beam reflected and/or scattered by the target object is shaped by the receiving optics and aimed at the detector along an optical axis. Measuring devices are divided into paraaxial arrangements in which the optical axes of the transmitting and receiving devices run in a parallelly offset manner, and coaxial arrangements in which the optical axes of the transmitting and receiving devices are stacked on top of one another and separated with the aid of a beam-splitting optical element. In the case of coaxial arrangements, the transmitting optics and the receiving optics are integrated into a common beam-shaping optical element, which shapes the laser beam and the reception beam.

European Patent Document No. EP 1 351 070 A1 discloses a known measuring device having a paraaxial arrangement of the transmitting and receiving devices. The beam source, the transmitting optics and the receiving optics are fastened on an optics carrier that is rigid per se. The detector is fastened on a printed circuit board, which is mechanically rigidly connected to the optics carrier via a screwed connection. The beam source and the receiving optics are inserted to their full extent into receptacles in the optics carrier and, where applicable, fixed with an adhesive connection in the optics carrier. The transmitting optics are adjustable along the optical axis thereof in the optics carrier and are adjusted when the beam source is activated; the optics are adhered to the optics carrier in the adjusted position. With an activated beam source, a manipulator is used to displace the detector relative to the printed circuit board in all three spatial directions, i.e., in the direction of its optical axis and in the plane perpendicular to the optical axis until the reception beam strikes a predetermined region of the detector. Then the detector is fixed in the adjusted position on the printed circuit board with a soldered connection. Adjustment tolerances are equalized by adjustment gaps with solder bridges and enlarged contact surfaces.

The disadvantage of solder bridges between the printed circuit board and an electro-optical component is that the reliability of the mechanical fastening of the electro-optical component on the printed circuit board is reduced as compared to a soldered connection without a gap. In addition, cold soldered joints may develop in the soldered connection. In the case of a cold soldered joint there is no integral connection between the solder and the connection partners. The mechanical and electrical properties of a cold soldered joint are deficient. However, cold soldered joints frequently do not cause an immediate electrical interruption. Because cold soldered joints are only able to withstand low mechanical stress, even slight vibrations and shocks to the soldered joint or an elongation of the soldered connection in the event of components that heat up may produce an electrical interruption. In addition to the problems related to production during soldering, solder bridges also have a detrimental effect on the high-frequency properties of the measuring devices. A solder bridge forms an inductivity, which impairs the signal integrity and electromagnetic compatibility (EMC) of the measuring device.

Improving a measuring device with respect to the disadvantages described above would be desirable. The object of the present invention is providing a measuring device for a laser distance measuring system that has a high degree of reliability of the mechanical fastening of the electro-optical components and improved high-frequency properties.

The invention provides that during the adjustment of the measuring device, the first of the electro-optical components arranged in the optics carrier and at least one beam-shaping optical element are adjustable relative to the optics carrier in the direction of the associated optical axes and the second of the electro-optical components arranged on the printed circuit board is adjustable and fixable in the adjusted position in a plane essentially perpendicular to the optical axis of the laser beam or reception beam, which is allocated to the second of the electro-optical components.

An electro-optical component is an optical component which must be supplied with electrical current to operate and which converts electrical current into light or light into electrical current, such as, for example, a beam source or a detector. Designated as an associated optical axis of an optical or electro-optical component is the optical axis of a laser beam or a reception beam, which is allocated to the respective optical or electro-optical component. For example, the associated optical axis of a beam source is the optical axis of the laser beam emitted by the beam source and the associated optical axis of a detector is the optical axis of the reception beam striking the detector.

Because both the first of the electro-optical components and at least one beam-shaping optical element are adjustable during the adjustment of the measuring device in the direction of the associated optical axes, the printed circuit board is able to serve as the locating surface for the second of the electro-optical components arranged on the printed circuit board. The adjustment in the direction of the optical axes is carried out exclusively via the optical and electro-optical components arranged in the optics carrier. The required adjustment of the second of the electro-optical components in the plane perpendicular to the optical axis is carried out via an adjustment of the second of the electro-optical components or via an adjustment of the printed circuit board. Because the printed circuit board serves as the locating surface for the second of the electro-optical components during the adjustment of the measuring device, no gap develops between the printed circuit board and the second of the electro-optical components which must be bridged by a solder bridge.

The plane in which the second of the electro-optical components is adjustable runs essentially perpendicular to the associated optical axis. A slight deviation from the right angle is tolerable as long as the resulting change in spacing from the beam-shaping optical element does not exceed a permissible value. An adjustment path of 500 μm in the plane perpendicular to the reception beam (detector as the second of the electro-optical components) and an angular deviation of 1° produce for example a change in spacing from the beam-shaping optical element of approx. 10 μm. This change in spacing leads to a displacement in the focal position, which is undesirable during the adjustment of the measuring device. The angular deviation may only lie in the order of magnitude in which the resulting displacement of the focal position during adjustment of the measuring device is still permissible. The optical and electro-optical components arranged in the optics carrier are adjustable in the direction of the respective associated optical axes, i.e., the adjustment directions of the components run essentially parallel to the optical axes. Deviations from the parallelism that develop for example because of fabrication tolerances of the optics carrier are permissible.

A preferred embodiment provides that during the adjustment of the measuring device, the printed circuit board is adjustable relative to the optics carrier in the plane perpendicular to the associated optical axis of the second of the electro-optical components and the first contact surface of the optics carrier acts as a locating surface for the printed circuit board in the direction of the associated optical axis of the second of the electro-optical components. The second of the electro-optical components arranged on the printed circuit board is especially preferably designed to not be adjustable relative to the printed circuit board. The advantage of this design is that the electro-optical component arranged on the printed circuit board may already be integrally connected to the printed circuit board prior to adjustment during assembly of the printed circuit board using a soldered connection. In this way, a gap between the printed circuit board and the electro-optical component that would have to be bridged by a solder bridge is avoided. The fact that the formation of a solder bridge is avoided increases the reliability of the mechanical fastening of the electro-optical components and improves the high-frequency properties.

The second of the electro-optical components is especially preferably arranged on a front side of the printed circuit board facing the optics carrier. If the adjustment of the second of the electro-optical components is accomplished via the printed circuit board, direct access to the electro-optical component is not required and the second of the electro-optical components is able to be protected from a direct impact of force by the arrangement on the front side.

An alternative preferred embodiment provides that during the adjustment of the measuring device, the second of the electro-optical components is adjustable relative to the printed circuit board in the plane perpendicular to the associated optical axis of the second of the electro-optical components and the printed circuit board acts as a locating surface for the second of the electro-optical components in the direction of the associated optical axis of the second of the electro-optical components. The rear side of the printed circuit board establishes the position of the second of the electro-optical components in the direction of the associated optical axis and the electro-optical component is pressed against the printed circuit board during soldering so that a solder bridge is avoided.

The second of the electro-optical components is preferably arranged on a rear side of the printed circuit board facing away from the optics carrier. Due to the arrangement on the rear side of the printed circuit board, the second of the electro-optical components is accessible to a manipulator for positioning the second of the electro-optical components and for creating a soldered connection. In addition, the advantage of the arrangement on the rear side is that the printed circuit board, which is made of an insulating material, acts as a shield between the first and the second of the electro-optical components so that optical and electrical crosstalk between the electro-optical components is reduced.

The optics carrier is designed to be monolithic in a preferred embodiment. A monolithic optics carrier is made of one material and is not assembled from several individual parts. Monolithic optics carriers do not have a connecting zone between a first and second connection partner. The advantage of a monolithic optics carrier as compared to a multi-part optics carrier is that the optics carrier changes uniformly under the influence of temperature; there are no regions in the optics carrier that change in a different way as a function of temperature because of different material properties. Monolithic optics carriers have a high level of stability, thereby guaranteeing low adjustment tolerances and a high level of adjustment accuracy of the installed components.

The optics carrier is preferably designed of a metallic material, for example zinc. Metallic optics carriers produce an electrical shield between the electro-optical components and reduce electrical crosstalk between a beam source and a detector. Zinc is able to be processed in a die casting process with a high degree of precision and also possesses a high degree of temperature stability so that fluctuations in temperature to which laser distance measuring systems are frequently subjected only have a slight effect on the adjustment state of the installed components and the measuring properties of the measuring device.

The connecting device, which connects the first contact surface of the optics carrier to the second contact surface of the printed circuit board, is preferably designed as a screwed connection. Due to the screwed connection, a conductive connection is produced between the optics carrier and the printed circuit board. This is necessary in order to guarantee a good signal intensity, good EMC properties and a good shielding effect on the installed components.

Alternatively, the connecting device, which connects the first contact surface of the optics carrier to the second contact surface of the printed circuit board, is designed as an adhesive and screwed connection. The advantages of both connection techniques are combined in the case of an adhesive and screwed connection. With adhesion, the force is transferred two-dimensionally from one connection partner to the other. However, the adhesive connection may change under the influence of temperature. Brittleness may develop at low temperatures and the adhesive connection might soften at high temperatures. With a screwed connection, voltage peaks develop at the connection partners, while the space in between hardly contributes to the transmission of power. It is advantageous that screwed connections are only subject to a low influence of temperature.

Exemplary embodiments of the invention are described in the following on the basis of the drawings. These drawings are not necessarily supposed to represent the exemplary embodiments to scale, rather the drawings are executed in a schematic and/or slightly distorted form when this is useful for explanatory purposes. Reference is made to the pertinent prior art with respect to additions to the teachings directly identifiable from the drawings. It must be taken into consideration in this case that a wide range of modifications and changes related to the form and detail of an embodiment may be undertaken without deviating from the general idea of the invention. The features of the invention disclosed in the description, the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

DETAILED DESCRIPTION OF THE DRAWINGS

Figure 1:
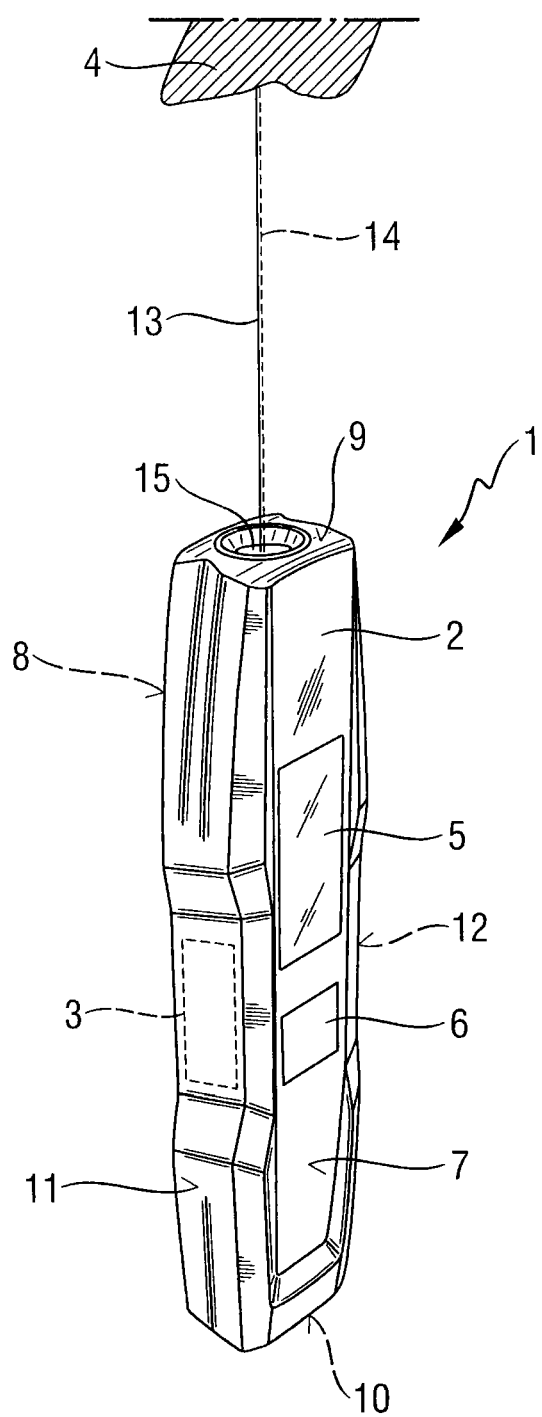
FIG. 1 illustrates a laser distance measuring system having a measuring device.

FIG. 1 shows a laser distance measuring system 1 in a three-dimensional representation. The laser distance measuring system 1 includes a housing 2, a measuring device 3, with which the distance to a target object 4 can be measured, a display device 5 for displaying the measured distance and an operating device 6 for starting the distance measurement and for adjusting the laser distance measuring system 1.

The measuring device 3 is arranged in the interior of the housing 2 and the display and operating devices 5, 6 are embedded in an upper side 7 of the housing 2. The upper side 7 and the lower side 8 of the housing 8, which is opposite from the upper side 7, form the largest housing surfaces of the laser distance measuring system 1. The front and rear sides 9, 10, which are adjacent to the upper side 7, and the side surfaces 11, 12 of the housing 2 are designed to be as small as possible in order to form a compact laser distance measuring system 1.

The measuring device 3 emits a laser beam 13, which is aimed at the target object 4. A reception beam 14 reflected and/or scattered by the target object 4 is detected by the measuring device 3. The exit of the laser beam 13 from the housing 2 takes place via an outcoupling opening 15, which is embedded in the front side 9 of the housing 2. The optical axis of the laser beam 13 is aligned approximately perpendicular to the front side 9. The reception beam 14 coming from the target object 4 enters the laser distance measuring system 1 via the outcoupling opening 15.

Measuring of the distance to the target object 4 is carried out with respect to a reference mark located on the laser distance measuring system. In the case of the laser distance measuring system 1, the front side 9 or the rear side 10 are used as reference marks. A switchover device is used to switch between the reference marks.

Figure 2:
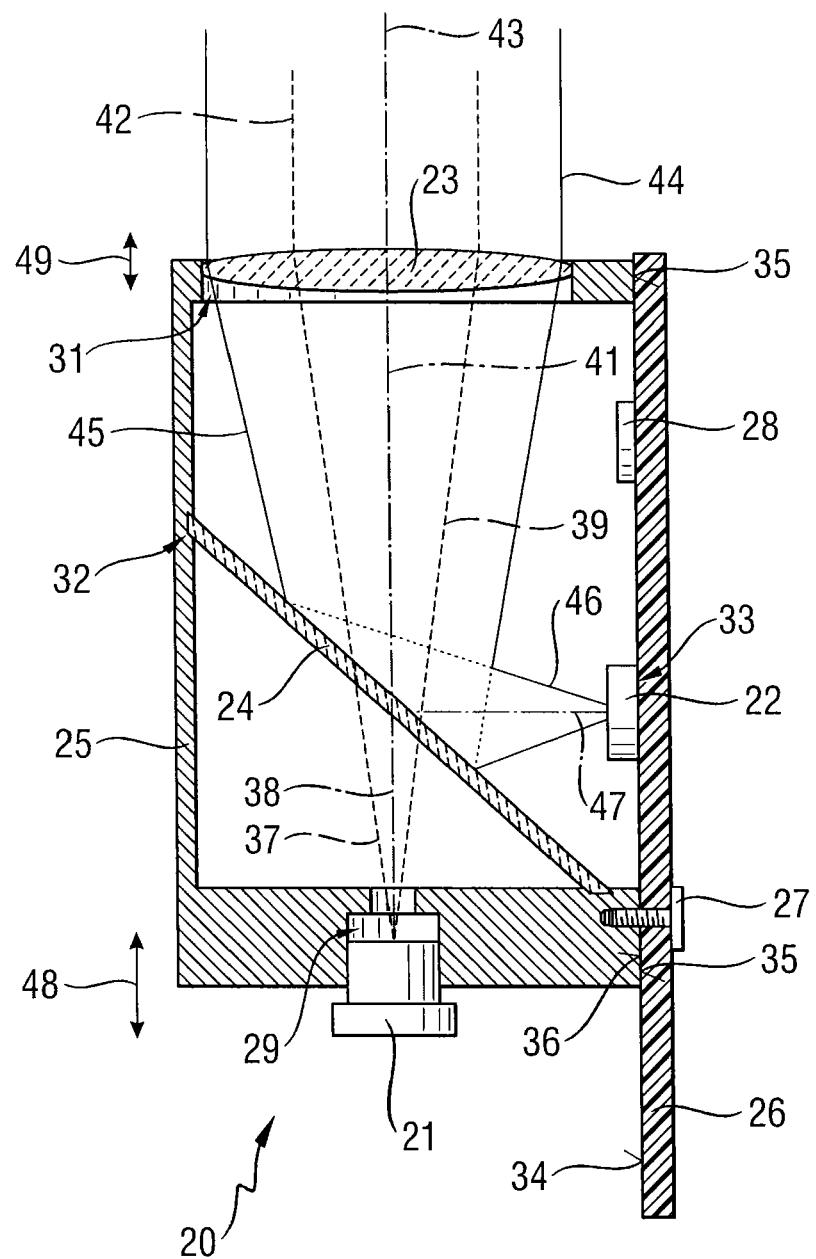
FIG. 2 is a first embodiment of a coaxial measuring device having a beam source, which is inserted in an optics carrier, a detector, which is arranged on a front side of a printed circuit board facing the optics carrier and, during the adjustment of the measuring device, is integrally connected to the printed circuit board, and a beam-splitting optical element, which is designed as a polarization beam splitter and is fastened in a receptacle of the optics carrier.

FIG. 2 schematically shows a first embodiment of a measuring device 20 having a coaxial design. The measuring device 20 includes an electro-optical component designed as a beam source 21, a further electro-optical component designed as a detector 22, a beam-shaping optical element 23, a beam-splitting optical element 24, an optics carrier 25 and a printed circuit board 26. The optics carrier 25 is connected to the printed circuit board 26 via a connecting device 27.

The beam source 21 is designed as a laser diode, which generates a laser beam in the visible spectrum, for example a red laser beam with a wavelength of 635 nm or a green laser beam with a wavelength of 532 nm. The detector 22 is designed as a photo diode, whose properties are adapted to the laser diode 21. A control and evaluation device 28 is connected to the beam source 21 and the detector 22 and determines the distance to the target object 4 from a time difference between a reference beam and the reception beam 14 detected by the detector 22.

The beam-shaping optical element 23 is designed as a lens, which shapes both the emitted laser beam 13 as well as the reception beam 14. Using the beam-splitting optical element 24, the laser beam is separated from the reception beam that runs coaxially. The beam-splitting optical element 24 is arranged in the optical path of the emitted laser beam between the beam source 21 and the beam-shaping optical element 23 and in the optical path of the reception beam reflected and/or scattered between the beam-shaping optical element 23 and the detector 22. The beam-splitting optical element 24 is configured as a polarization beam splitter, which is designed for light that is predominantly transmitting with the polarization direction of the emitted laser beam (transmittance greater than approx. 80%) and for unpolarized light that is partially reflecting (reflectance approx. 50%). Radiation reflected at the target object 4, i.e., the reflected portion of the reception beam, has a high intensity and has the same polarization direction as the emitted laser beam, whereas radiation scattered at the target object 4, i.e., the scattered portion of the reception beam, is unpolarized. The beam-splitting optical element 24 is used to strongly dampen the portion of the reception beam that is reflected at the target object 4 and therefore polarized so as to prevent the detector 22 from overloading.

A printed circuit board is a carrier for electronic and electro-optical structural elements and is used for mechanical fastening and electrical connection. Printed circuit boards are made of electrically insulating material, for example fiber-reinforced plastic, Teflon® or ceramic, with connected conductor tracks. The structural elements are soldered on soldering areas or in soldering pads and in this way are simultaneously secured mechanically and electrically connected. Larger structural elements may be fastened to the printed circuit board with adhesive or screwed connections.

The beam source 21, the beam-shaping optical element 23 and the beam-splitting optical element 24 are arranged on the optics carrier 25. The optics carrier 25 has a first receptacle 29 for the first electro-optical component designed as the beam source 21, a second receptacle 31 for the beam-shaping optical element 23 and a third receptacle 32 for the beam-splitting optical element 24. The second electro-optical component designed as the detector 22 is arranged on the printed circuit board 26 in a further receptacle 33, wherein the printed circuit board 26 acts as a further optics carrier for the second electro-optical component.

The optics carrier 25 is designed as a monolithic optics carrier, which is not assembled from several individual parts, but is made of one material. Monolithic optics carriers do not have a connecting zone between a first and second connection partner. The optics carrier 25 is made of a metallic material, for example zinc. Metallic optics carriers produce an electrical shield between the electro-optical components and reduce electrical crosstalk between the beam source and the detector. Zinc has a high level of temperature stability so that temperature fluctuations to which laser distance measuring systems are frequently subjected only have a slight effect on the adjustment state of the installed components and the measuring properties of the measuring device. In addition, zinc is able to be processed with a high degree of precision in a die casting process so that the receptacles 31, 32, 33 are very precisely produced and positioned in relation to one another.

The detector 22 is arranged on a front side 34 of the printed circuit board 26 facing the optics carrier 25 and firmly connected to the printed circuit board 26 via a soldered connection; the detector 22 may be automatically assembled and soldered during production of the printed circuit board 26, for example. The detector 22 is connected and mechanically secured only to the printed circuit board 26; no connecting means are present that connect the detector 22 directly to the optics carrier 25. The optics carrier 25 is designed to be open on the side facing the detector 22 in the installed state at least in the region of the detector 22 and is connected with a first contact surface 35 via the connecting device 27 to a second contact surface 36, which is arranged on the front side 34 of the printed circuit board 26. The connecting device 27 is designed to be detachable at least during the adjustment of the measuring device 20 and the adjustment of the detector 22.

The beam source 21 emits a divergent primary laser beam 37 along an optical axis 38. The primary laser beam strikes the polarization beam splitter 24, on which the largest possible portion is transmitted and strikes the beam-shaping optical element 23 as a divergent secondary laser beam 39 in the direction of an optical axis 41. The beam-shaping optical element 23 focuses the laser beam and aims a tertiary laser beam 42 with less divergence in the direction of an optical axis 43 at the target object 4.

The reception beam reflected and/or scattered by the target object 4, which is designed in the following as the primary reception beam 44, strikes the beam-shaping optical element 23, which focuses the primary reception beam 44 and aims it at the beam-splitting optical element 24 as the secondary reception beam 45. The optical axis of the secondary reception beam 45 runs coaxially to the optical axis 41 of the secondary laser beam 39. The secondary reception beam 45 is at least partially reflected by the beam-splitting optical element 24 and the reflected portion is aimed at the detector 22 as a tertiary reception beam 46 along an optical axis 47. The beam-splitting optical element 24 makes sure that the optical axis 47 of the tertiary reception beam 46 and the optical axis 38 of the primary laser beam 37 are different from one another. The primary reception beam 44 depicted in FIG. 2 does not correspond to the actual light distribution in the outside area, but in fact to the effective aperture angle of the receiving system made up of the beam-shaping optical element 23 and the active surface of the detector 22.

The beam source 21 and the beam-shaping optical element 23 are configured to be adjustable in their receptacles 29, 31 at least during the adjustment of the measuring device 20 respectively in a back and/or forth direction 48, 49, which runs parallel to the associated optical axis 38, 43, wherein the back and/or forth directions 48, 49 are also designated as adjustment directions. The beam source 21 and the beam-shaping optical element 23 are adjustable exclusively in the adjustment direction 48, 49 during the adjustment of the measuring device 20; adjustability in the direction of a plane perpendicular to the optical axes 38, 43 is not provided.

The adjustment of the measuring device 20 is accomplished by an optical instrument, which includes a lens and a digital camera chip, which is arranged in the focal plane of the lens. The optical instrument is adjusted to a desired object distance, wherein the object distance may be adjusted as a finite distance, for example 10 m, or an infinite distance. The measuring device 20 is arranged in front of the lens in such a way that the lens detects the tertiary laser beam 42 and an image of the active surface of the detector 22 and reproduces it on the camera chip. Both the laser beam and the image of the active surface of the detector 22 are simultaneously depicted on the camera chip.

The adjustment of the measuring device 20 is carried out in two stages: In a first stage, the optical components 21, 23 are adjusted in the optics carrier 25 in their respective adjustment direction 48, 49 and, after adjustment of the optics carrier 25, the detector 22 is adjusted in a second stage in a plane perpendicular to the associated optical axis 47. The first and second receptacles 29, 31 in the optics carrier 25 are designed so that the electro-optical component and the beam-shaping optical element 23 are only adjustable in their adjustment direction 48, 49; an adjustment in a plane perpendicular to the optical axes is not possible.

In the first stage, the beam-splitting optical element 24 is first inserted into the third receptacle 32 and fixed on the optics carrier 25. The connection may be designed to be detachable or non-detachable. Then, the beam source 21 and the beam-shaping optical element 23 are inserted into their receptacles 29, 31. In order to adjust the beam-shaping optical element 23 and the beam source 21, the printed circuit board 26 with the detector 22 is brought to the limit stop with the optics carrier 25 and detachably connected to the optics carrier 25 by the connecting device 27.

The beam-shaping optical element 23 is displaced in its adjustment direction 49 until the optical instrument is adjusted to the desired object distance and a sharp image of the active surface of the detector 22 is detected by the beam-shaping optical element 23, wherein the image is sharp with a high level of contrast. In the case of maximum image sharpness, the beam-shaping optical element 23 is adjusted in terms of the active surface of the detector 22 to the desired distance that corresponds to the object distance of the optical instrument. The second receptacle 31 for the beam-shaping optical element 23 is designed as a press fit for example and the beam-shaping optical element 23 is fixed by the clamping force of the press fit 31; the displacement of the beam-shaping optical element 23 in the adjustment direction 49 takes place under sufficient pressure against the clamping force of the press fit 31. As an alternative or in addition to the press fit, the beam-shaping optical element 23 may also be integrally connected to the optics carrier 25 for example by an adhesive connection.

After the beam-shaping optical element 23, the beam source 21 is adjusted. The beam source 21 emits a beam, which is monitored by the optical instrument. The laser diode 21 is displaced in the direction 48 until the optical instrument detects a minimum focal point of the laser beam by the beam-shaping optical element 23. In this case, the beam waist of the laser beam is at the desired distance. The first receptacle 29 for the beam source 21 is designed as a press fit for example and the beam source 21 is fixed by the clamping force of the press fit 29; the displacement of the beam source 21 in the adjustment direction 48 takes place under sufficient pressure against the clamping force of the press fit 29. As an alternative or in addition to the press fit, the beam source 21 may be integrally connected to the optics carrier 25 for example by an adhesive connection.

After adjustment of the optics carrier 25, the detector 22 is adjusted. Because the detector 22 is connected to the printed circuit board 26 in a non-detachable manner via a soldered connection, the detector 22 is adjusted relative to the optics carrier 25 via the printed circuit board 26. To this end, the connecting device 27, which is designed to be detachable at least during the adjustment of the measuring device 20, is disconnected between the optics carrier 25 and the printed circuit board 26. The beam source 21 is switched on and emits a laser beam, which is detected by the optical instrument together with the image of the active detector surface. The laser beam forms a focal point on the camera chip and the active detector surface forms a sharp image, which is superimposed on the focal point of the laser beam. The printed circuit board 26 is displaced in the plane, which is aligned perpendicular to the optical axis 47 of the tertiary reception beam 46, to the limit stop with the optics carrier 25 until the focal point of the laser beam on the camera chip is in a specific range of the active surface of the detector 22. In this case, the position of the focal point of the laser beam corresponds to the position of a reception beam focused on the photo diode 22, which reception beam was scattered by a target object arranged in the object distance of the optical instrument.

Then the adjusted printed circuit board 26 is connected to the optics carrier 25. This permanent connection is accomplished in two steps. In a first step, the printed circuit board 26 is connected in a force-free manner to the optics carrier 25 via an adhesive connection. In a second step, the printed circuit board 26 is connected to the optics carrier 25 via a screwed connection. Alternatively, the printed circuit board may be screwed in place first under sufficient pressure and then additionally secured by adhesive.

In the case of adhesion, the force is transmitted two-dimensionally from one connection partner to the other. An adhesive connection does not require any change of the connection partner and may be reversed in many cases without damaging the connection partner. The adhesive connection may change under the influence of temperature, however. Brittleness may develop at low temperatures and the adhesive connection might soften at high temperatures. With a screwed connection, voltage peaks develop at the connection partners, while the space in between hardly contributes to the transmission of power. It is advantageous that screwed connections are only subject to a low influence of temperature. In addition, a screwed connection produces an electrical connection between the optics carrier and the printed circuit board.

Figure 3:
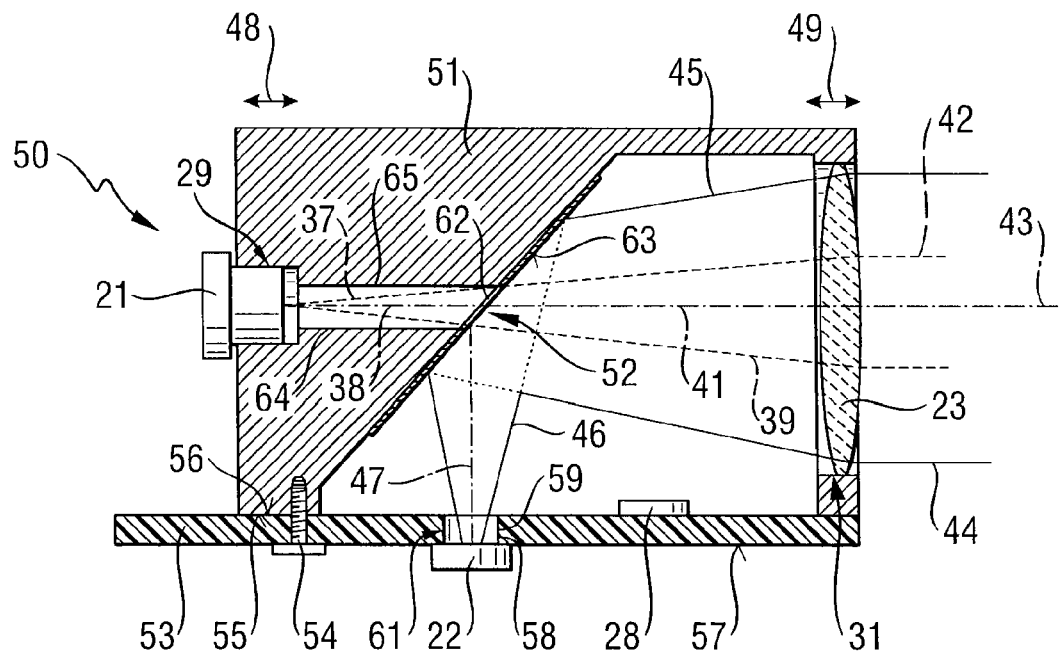
FIG. 3 is a second embodiment of a coaxial measuring device having a beam source, which is inserted in an optics carrier, a detector, which is arranged on a rear side of the printed circuit board facing away from the optics carrier and, during the adjustment of the measuring device, is adjustable in relation to the printed circuit board, and a beam-splitting optical element, which is designed as an aperture mirror and is integrated into the optics carrier.

FIG. 3 schematically shows a second embodiment of a coaxial measuring device 50, which differs from the coaxial measuring device 20 in FIG. 2 by the design of the optics carrier, the arrangement of the detector and the design of the beam-splitting optical element.

The measuring device 50 includes a monolithic optics carrier 51, in which the beam source 21 is arranged as a first electro-optical component, and the beam-shaping optical element 23 and a beam-splitting optical element 52 along with a printed circuit board 53 on which the detector 22 is arranged as a second electro-optical component and which is connected to the optics carrier 51 via a connecting device 54. The printed circuit board 53 assumes the function of an optics carrier for the detector 22. The connecting device 54 connects a first contact surface 55 of the optics carrier 51 to a corresponding second contact surface 56 of the printed circuit board 53.

Like the optics carrier 25 of the measuring device 20, the optics carrier 51 has the first receptacle 29 for the beam source 21 and the second receptacle 31 for the beam-shaping optical element 23. The beam source 21 and the beam-shaping optical element 23 are adjustable in their receptacles 29, 31 in the respective direction 48, 49 at least during adjustment of the measuring device 50. The detector 22 is arranged on a rear side 57 of the printed circuit board 53 facing away from the optics carrier 51 and is detachably connected to the printed circuit board 53 via a connecting device 58 at least during the adjustment of the measuring device 50. The printed circuit board 53 is provided with a through bore 59, which acts as an aperture for the tertiary reception beam 44. The printed circuit board 53 has a receptacle 61 for the detector 22.

In contrast to the polarization beam splitter 24 of measuring device 20, the beam-splitting optical element 52 is designed as an aperture mirror and is integrated into the optics carrier 51. The aperture mirror 52 is arranged in the optical path of the laser beam between the beam source 21 and the beam-shaping optical element 23 and in the optical path of the reception beam between the beam-shaping optical element 23 and the detector 22. The aperture mirror 52 includes an opening 62 through which the laser beam passes. The opening 62 is enclosed by a coating 63, which is designed for example as a metallic coating and is predominantly reflecting for the reception beam independent of a polarization direction, for example with a reflectance greater than approx. 95%. Radiation reflected at the target object 4 is essentially reflected back per se so that the reflected portion of the reception beam strikes the beam-splitting optical element 52 in the area of the opening 62 and is not reflected to the detector 22. Due to the high reflectance of the coating 63, the scattered portion of the reception beam is reflected for the most part to the detector 22.

An aperture 64, which is integrated into the optics carrier 51, is arranged in the optical path of the primary laser beam 37 between the beam source 21 and the aperture mirror 52. The aperture 64 is used to limit the aperture angle or the numerical aperture of the beam source 21 and adjust the geometry of the primary laser beam 37 to the beam-splitting optical element 52 and the beam-shaping optical element 23. A light trap 65 is arranged between the beam source 21 and the aperture 64, and like the aperture 64, the light trap is integrated into the optics carrier 51. The light trap 65 is used to absorb incoming light and prevent undesired reflections. In addition, the aperture 64 and the light trap 65 reduce optical and electrical crosstalk from the beam source 21 to the detector 22.

In the embodiment in FIG. 3, the beam-splitting optical element is designed as an aperture mirror 52. It is possible to provide an aperture and/or a light trap to reduce optical and electrical crosstalk from the beam source to the detector for each beam-splitting optical element, i.e., also for a beam-splitting optical element designed as a polarization beam splitter or another suitable beam-splitting optical element.

Adjustment of the optics carrier 51 is accomplished in a manner analogous to the measuring device 20 in FIG. 2, wherein the printed circuit board 53 and the detector 22 on the rear side of the printed circuit board 53 is in contact as far as it will go with the optics carrier 25. After adjustment of the optics carrier 51, the detector 22 is adjusted in the plane which is aligned perpendicular to the optical axis 47 of the tertiary reception beam 46. The laser diode 21 is switched on and emits a laser beam, which is detected by the optical instrument together with the image of the active surface of the detector 22. The laser beam forms a focal point on the camera chip and the active surface of the detector 22 forms a sharp image, which is superimposed on the focal point. The detector 22 is accessible to a manipulator on the rear side 57 of the printed circuit board 53. The detector 22 is displaced in the plane perpendicular to the optical axis 47 until the focal point of the laser beam on the camera chip is in a specific range of the active surface of the detector 22. The position of the focal point of the laser beam corresponds in this case to the position of the reception beam focused on the detector 22 and scattered by a distant target object (at the object distance). Then, the detector 22 is fixed in the adjusted position on the rear side 57 of the printed circuit board 53 with a soldered connection on the printed circuit board 53. The adjusted position of the detector 22 is characterized in that there is no gap in the direction of the optical axis 47 to be bridged between the detector 22 and the printed circuit board 53. The detector 22 is positioned in such a way that the rear side 57 of the printed circuit board 53 serves as a locating surface for detector 22.

Figure 4:
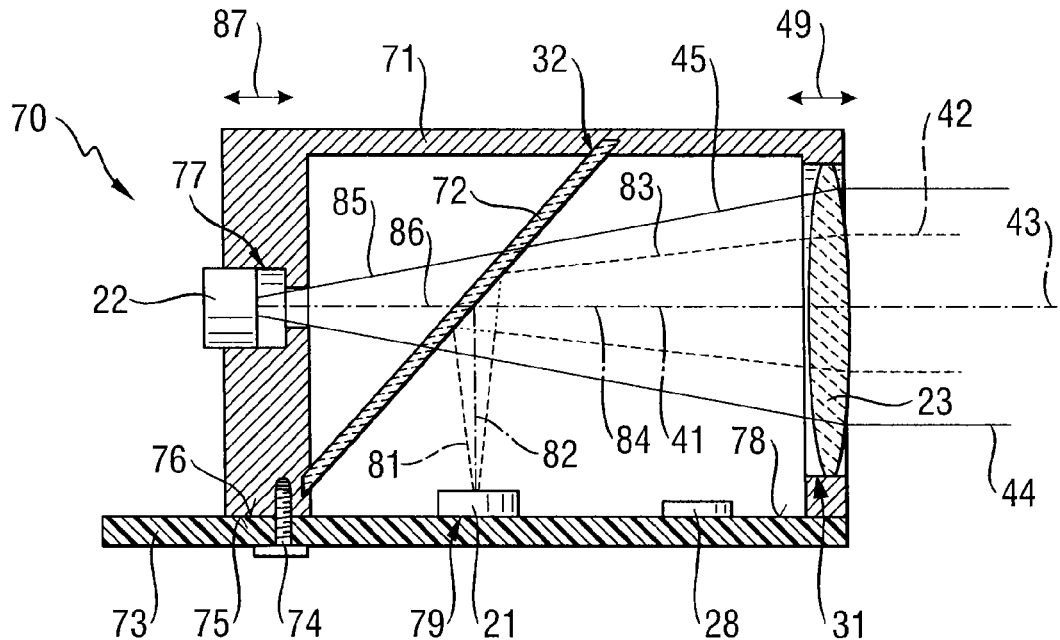
FIG. 4 is a third embodiment of a coaxial measuring device having a detector, which is inserted in an optics carrier, a beam source, which is arranged on the front side of a printed circuit board facing the optics carrier and, during the adjustment of the measuring device, is firmly connected to the printed circuit board, and a beam-splitting optical element, which is configured as a polarization beam splitter and is fastened in a receptacle of the optics carrier.

FIG. 4 schematically shows a third embodiment of a coaxial measuring device 70, which differs from the coaxial measuring device 20 in terms of arrangement of the beam source 21 and the detector 22. In contrast to the measuring device 20, the beam source 21 is arranged on the printed circuit board and the detector 22 in the monolithic optics carrier.

The measuring device 70 includes a monolithic optics carrier 71, in which the detector 22 is arranged as a first electro-optical component, and the beam-shaping optical element 23 and a beam-splitting optical element 72 along with a printed circuit board 73 on which the beam source 21 is arranged as a second electro-optical component. The printed circuit board 73 is connected to the optics carrier 71 via a connecting device 74. In this case, the connecting device 74 connects a first contact surface 75 of the optics carrier 71 to a correspondingly designed second contact surface 76 of the printed circuit board 73.

The optics carrier 71 has a first receptacle 77 for the detector 22, the second receptacle 31 for the beam-shaping optical element 23 and the third receptacle 32 for the beam-splitting optical element 72. The beam source 21 is arranged on a front side 78 of the printed circuit board 73 facing the optics carrier 71 and is firmly connected to the printed circuit board 73 in a receptacle 79. The printed circuit board 73 is detachably connected to the optics carrier 71 via the connecting device 74 at least during the adjustment of the beam source 21.

The beam source 21 emits a divergent primary laser beam 81 along an optical axis 82, which is aimed at the beam-splitting optical element 72. The beam-splitting optical element 72 is configured as a polarization beam splitter, which is designed for light that is predominantly reflective with the polarization direction of the emitted laser beam 81 (reflectance greater than approx. 80%) and for unpolarized light that is partially transmitting (transmittance approx. 50%). The primary laser beam 81 strikes the polarization beam splitter 72, on which the greatest portion is reflected and is diverted along an optical axis 84 as a divergent secondary laser beam 83. The beam-shaping optical element 23 focuses the secondary laser beam 83 at the target object 4 as a tertiary laser beam 42 with low divergence along the optical axis 43.

The primary reception beam 44 reflected and/or scattered by the target object 4 strikes the beam-shaping optical element 23, which focuses the reception beam 44 and aims it at the beam-splitting optical element 72 as a secondary reception beam 45 along the optical axis 41. The secondary reception beam 45 passes through the beam-splitting optical element 72 and is aimed at the detector 22 as a tertiary reception beam 85 along an optical axis 86. The beam-splitting optical element 72 makes sure that the optical axis 86 of the tertiary reception beam 85 and the optical axis 82 of the primary laser beam 81 are different from each other. The beam-shaping optical element 23 and the detector 22 are designed to be adjustable respectively in their receptacles 31, 77 in an adjustment direction 49, 87 running respectively parallel to the associated optical axis 43, 86 at least during the adjustment of the measuring device 70; adjustability in the direction of a plane perpendicular to the respective optical axis 43, 86 is not provided.

The measuring device 70 is adjusted by the optical instrument described in FIG. 2. First, the optical components 22, 23 of the optics carrier 71 are adjusted in their respective adjustment directions 87, 49. The beam-splitting optical element 72 is inserted into the third receptacle 32 and is connected to the optics carrier 71. The detector 22 and the beam-shaping optical element 23 are inserted into the first and second receptacles 77, 31 of the optics carrier 71. The printed circuit board 73 is temporarily connected to the optics carrier 71 up to the limit stop with the first contact surface 75. The beam source 21 is activated. The measuring device 70 is placed in front of the optical instrument in such a way that both the tertiary laser beam 85 and the image of the active surface of the detector 22 are detected by the camera chip.

The beam-shaping optical element 23 is displaced in the associated direction 49 until the optical instrument detects a minimum focal point of the tertiary laser beam 85. Then, the detector 22 is displaced in the associated direction 87 until the optical instrument detects a sharp image of the detector surface using the beam-shaping optical element 23. The adjusted positions of the beam-shaping optical element 23 and of the detector 22 are permanently fixed to the optics carrier 71 for example by adhesive connections.

After adjustment of the optics carrier 71, the beam source 21 is adjusted. The beam source 21 is adjusted via an adjustment of the printed circuit board 73 to the optics carrier 71. To this end, the connecting device 74 is disconnected between the optics carrier 71 and the printed circuit board 73. The beam source 21 is switched on and emits a laser beam, which is detected by the optical instrument together with the image of the active surface of the detector 22. The laser beam forms a focal point on the camera chip of the optical instrument and the active surface forms a sharp image, which is superimposed on the focal point. The printed circuit board 73 is displaced in the plane, which is aligned perpendicular to the optical axis 82 of the primary laser beam 81, up to the limit stop with the optics carrier 71 until the focal point of the laser beam is in a specific range of the active surface of the detector 22. The printed circuit board 73 is permanently connected to the optics carrier 71 in the adjusted position.

Figure 5:
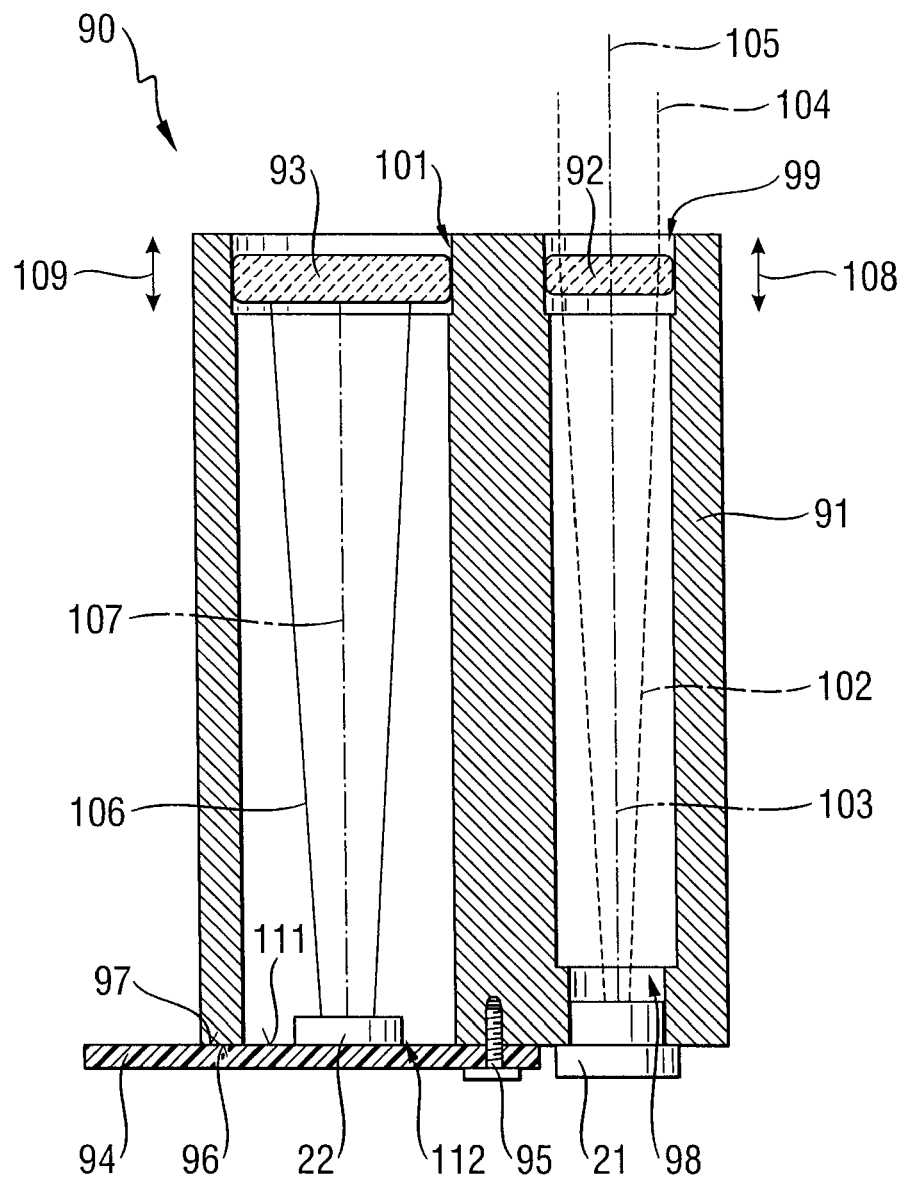
FIG. 5 is a first embodiment of a paraaxial measuring device having a beam source, transmitting optics and receiving optics, which are inserted in an optics carrier, and a detector, which is arranged on a front side of a printed circuit board facing the optics carrier and, during adjustment of the measuring device, is firmed connected to the printed circuit board.

FIG. 5 schematically shows a first embodiment of a measuring device 90 having a paraaxial design. In the case of a paraaxial measuring device, the laser beam and the reception beam run parallel to each other so that a beam-splitting optical element is not required. However, two beam-shaping optical elements are required with a paraaxial measuring device, a first beam-shaping optical element designed as transmitting optics for shaping the beam of the laser beam and a second beam-shaping optical element designed as receiving optics for shaping the beam of the reception beam.

The measuring device 90 includes a monolithic optics carrier 91, in which the beam source 21, transmitting optics 92 and receiving optics 93 are arranged, and a printed circuit board 94, on which the detector 22 is arranged and which is connected to the optics carrier 91 via a connecting device 95. The connecting device 95 connects a first contact surface 96 of the optics carrier 91 to a correspondingly designed second contact surface 97 of the printed circuit board 94.

The monolithic optics carrier 91 has a first receptacle 98 for the beam source 21, a second receptacle 99 for the transmitting optics 92 and a third receptacle 101 for the receiving optics 93. The beam source 21 emits a laser beam 102 along an optical axis 103, the transmitting optics 92 focuses the laser beam at the target object 4 as the laser beam 104 along an optical axis 105 and the receiving optics 93 focuses a reception beam 106 at the detector 22 along an optical axis 107. The transmitting optics 92 and the receiving optics 93 are respectively adjustable in an adjustment direction 108, 109 that runs parallel to the optical axis 103, 105 of the laser beam 102, 104 or parallel to the optical axis 107 of the reception beam 106 at least during adjustment of the measuring device 90. As an alternative to the adjustability of the transmitting optics 92 in the adjustment direction 108, the beam source 21 or the transmitting optics 92 and the beam source 21 are designed to be adjustable in the adjustment direction 108.

The detector 22 is arranged on a front side 111 of the printed circuit board 94 facing the optics carrier 91 and is firmly connected to the printed circuit board 94 in a receptacle 112 during the adjustment of the measuring device 90. The printed circuit board 94 is detachably connected to the optics carrier 91 via the connecting device 95 at least during the adjustment of the measuring device 90.

The measuring device 90 is adjusted by the optical instrument described in FIG. 2. The beam source 21 is inserted to its full extent into the first receptacle 99 and connected to the optics carrier 91. The transmitting optics 92 and the receiving optics 93 are inserted into the second and third receptacles 99, 101 of the optics carrier 91. The printed circuit board 94 is temporarily connected to the optics carrier 91 and the beam source 21 is activated. The transmitting optics 92 are displaced in the adjustment direction 108 thereof until the optical instrument detects a minimum focal point. Then, the receiving optics 93 are displaced in the adjustment direction 109 thereof until the optical instrument detects a sharp image of the detector surface. The temporary connection between the optics carrier 91 and the printed circuit board 94 is disconnected. The printed circuit board 94 is displaced in the plane which runs perpendicular to the optical axis 107 of the reception beam 106 until the focal point of the reception beam is in a specific range of the active surface of the detector 22. During the adjustment of the printed circuit board 94, the first contact surface 96 of the optics carrier 91 is used as a locating surface for the printed circuit board 94.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A measuring device for measuring a distance between a reference mark and a target object, comprising:
   a first electro-optical component and a second electro-optical component which differs from the first electro-optical components, wherein the first and second electro-optical components include a beam source generating a laser beam and a detector detecting a reception beam;
   a beam-shaping optical element;
   a beam-splitting optical element, wherein the laser beam or the reception beam is deflectable by the beam-splitting optical element;
   a monolithic optics carrier including a first receptacle, wherein the first electro-optical component is mounted in the first receptacle, a second receptacle, wherein the beam-shaping optical element is mounted in the second receptacle, and a third receptacle, wherein the beam-splitting optical element is mounted in the third receptacle;
   a printed circuit board including a further receptacle, wherein the second electro-optical component is mounted in the further receptacle; and
   a connecting device, wherein the monolithic optics carrier is connectable to the printed circuit board by the connecting device;
   wherein, during an adjustment of the measuring device, the first electro-optical component and the beam-shaping optical element are only adjustable relative to the monolithic optics carrier in a direction of an associated respective optical axis of the first electro-optical component and the beam-shaping optical element, and the second electro-optical component is adjustable and fixable only in a plane essentially perpendicular to an associated optical axis of the second electro-optical component, such that no gap develops between the printed circuit board and the second electro-optical component in a direction of the associated optical axis of the second electro-optical component and such that no solder bridge exists between the printed circuit board and the second electro-optical component.

2. The measuring device according to claim 1, wherein, during the adjustment of the measuring device, the printed circuit board is adjustable relative to the monolithic optics carrier in the plane and a contact surface of the monolithic optics carrier abuts the printed circuit board in a direction of the associated optical axis of the second electro-optical component.

3. The measuring device according to claim 1, wherein the second electro-optical component is disposed on a side of the printed circuit board that faces the monolithic optics carrier.

4. The measuring device according to claim 1, wherein the second electro-optical component is adjustable relative to the printed circuit board in the plane.

5. The measuring device according to claim 1, wherein the second electro-optical component is disposed on a rear side of the printed circuit board facing away from the monolithic optics carrier.

6. The measuring device according to claim 1, wherein the monolithic optics carrier is a metallic material.

7. The measuring device according to claim 1, wherein the connecting device is a screwed connector.

8. The measuring device according to claim 1, wherein the connecting device is an adhesive and a screwed connector.

9. A method for adjusting a measuring device, wherein the measuring device comprises:
   a first electro-optical component and a second electro-optical component which differs from the first electro-optical component, wherein the first and second electro-optical components include a beam source generating a laser beam and a detector detecting a reception beam;
   a beam-shaping optical element;
   a beam-splitting optical element, wherein the laser beam or the reception beam is deflectable by the beam-splitting optical element;
   a monolithic optics carrier including a first receptacle, wherein the first electro-optical component is mounted in the first receptacle, and a second receptacle, wherein the beam-shaping optical element is mounted in the second receptacle, and a third receptacle, wherein the beam-splitting optical element is mounted in the third receptacle;

wherein the first electro-optical component and the beam-shaping optical element are only adjustable relative to the monolithic optics carrier in a direction of an associated respective optical axis of the first electro-optical component and the beam-shaping optical element;

a printed circuit board including a further receptacle, wherein the second electro-optical component is mounted in the further receptacle; and a connecting device, wherein the monolithic optics carrier is connectable to the printed circuit board by the connecting device;

and comprising the steps of:

adjusting the first electro-optical component and the beam-shaping optical element relative to the monolithic optics carrier in the direction of the associated respective optical axis of the first electro-optical component and the beam-shaping optical element;

abutting the printed circuit board against the monolithic optics carrier; and adjusting the second electro-optical component only in a plane essentially perpendicular to an associated optical axis of the second electro-optical component such that no gap develops between the printed circuit board and the second electro-optical component in a direction of the associated optical axis of the second electro-optical component and such that no solder bridge exists between the printed circuit board and the second electro-optical component.

10. The method according to claim 9, wherein the step of adjusting the second electro-optical component only in the plane essentially perpendicular to the associated optical axis of the second electro-optical component includes the step of adjusting the printed circuit board relative to the monolithic optics carrier in the plane.

11. The method according to claim 9, wherein the second electro-optical component is disposed on a side of the printed circuit board that faces the monolithic optics carrier.

12. The method according to claim 9, wherein the step of adjusting the second electro-optical component only in the plane essentially perpendicular to the associated optical axis of the second electro-optical component includes the step of adjusting the second electro-optical component relative to the printed circuit board in the plane.

13. The method according to claim 9, wherein the second electro-optical component is disposed on a rear side of the printed circuit board facing away from the monolithic optics carrier.

14. The method according to claim 9, wherein the monolithic optics carrier is a metallic material.

15. A measuring device for measuring a distance between a reference mark and a target object, comprising:

a first electro-optical component and a second electro-optical component which differs from the first electro-optical component, wherein the first and second electro-optical components include a beam source generating a laser beam and a detector detecting a reception beam;

a beam-shaping optical element;

a beam-splitting optical element, wherein the laser beam or the reception beam is deflectable by the beam-splitting optical element;

a monolithic optics carrier including a first receptacle, wherein the first electro-optical component is mounted in the first receptacle, and a second receptacle, wherein the beam-shaping optical element is mounted in the second receptacle, and wherein the beam-splitting optical element is an aperture mirror and is integrated into the monolithic optics carrier;

a printed circuit board including a third receptacle, wherein the second electro-optical component is mounted in the third receptacle; and a connecting device, wherein the monolithic optics carrier is connectable to the printed circuit board by the connecting device;

wherein, during an adjustment of the measuring device, the first electro-optical component and the beam-shaping optical element are only adjustable relative to the monolithic optics carrier in a direction of an associated respective optical axis of the first electro-optical component and the beam-shaping optical element, and the second electro-optical component is adjustable and fixable only in a plane essentially perpendicular to an associated optical axis of the second electro-optical component, such that no gap develops between the printed circuit board and the second electro-optical component in a direction of the associated optical axis of the second electro-optical component and such that no solder bridge exists between the printed circuit board and the second electro-optical component.

16. A method for adjusting a measuring device, wherein the measuring device comprises:

a first electro-optical component and a second electro-optical component which differs from the first electro-optical component, wherein the first and second electro-optical components include a beam source generating a laser beam and a detector detecting a reception beam;

a beam-shaping optical element;

a beam-splitting optical element, wherein the laser beam or the reception beam is deflectable by the beam-splitting optical element;

a monolithic optics carrier including a first receptacle, wherein the first electro-optical component is mounted in the first receptacle, and a second receptacle, wherein the beam-shaping optical element is mounted in the second receptacle, and wherein the beam-splitting optical element is an aperture mirror and is integrated into the monolithic optics carrier;

wherein the first electro-optical component and the beam-shaping optical element are only adjustable relative to the monolithic optics carrier in a direction of an associated respective optical axis of the first electro-optical component and the beam-shaping optical element;

a printed circuit board including a third receptacle, wherein the second electro-optical component is mounted in the third receptacle; and a connecting device, wherein the monolithic optics carrier is connectable to the printed circuit board by the connecting device;

and comprising the steps of:

adjusting the first electro-optical component and the beam-shaping optical element relative to the monolithic optics carrier in the direction of the associated respective optical axis of the first electro-optical component and the beam-shaping optical element;

abutting the printed circuit board against the monolithic optics carrier; and adjusting the second electro-optical component only in a plane essentially perpendicular to an associated optical axis of the second electro-optical component such that no gap develops between the printed circuit board and the second electro-optical component in a direction of the associated optical axis of the second electro-optical component and such that no solder bridge exists between the printed circuit board and the second electro-optical component.

17. A measuring device for measuring a distance between a reference mark and a target object, comprising:
- a first electro-optical component and a second electro-optical component which differs from the first electro-optical component, wherein the first and second electro-optical components include a beam source generating a laser beam and a detector detecting a reception beam;
- a first beam-shaping optical element and a second beam-shaping optical element which differs from the first beam-shaping optical element, wherein the first and second beam-shaping optical elements shape the laser beam and the reception beam;
- a monolithic optics carrier including a first receptacle, wherein the first electro-optical component is mounted in the first receptacle, a second receptacle, wherein the first beam-shaping optical element is mounted in the second receptacle, and a third receptacle, wherein the second beam-shaping optical element is mounted in the third receptacle;
- a printed circuit board including a further receptacle, wherein the second electro-optical component is mounted in the further receptacle; and
- a connecting device, wherein the monolithic optics carrier is connectable to the printed circuit board by the connecting device;
- wherein, during an adjustment of the measuring device, the first electro-optical component and/or the first beam-shaping optical element are only adjustable relative to the monolithic optics carrier in a direction of an associated respective optical axis of the first electro-optical component and/or the first beam-shaping optical element, the second beam-shaping optical element is only adjustable relative to the monolithic optics carrier in a direction of an associated respective optical axis of the second beam-shaping optical element, and the second electro-optical component is adjustable and fixable only in a plane essentially perpendicular to an associated optical axis of the second electro-optical component, such that no gap develops between the printed circuit board and the second electro-optical component in a direction of the associated optical axis of the second electro-optical component and such that no solder bridge exists between the printed circuit board and the second electro-optical component.

18. A method for adjusting a measuring device, wherein the measuring device comprises:
- a first electro-optical component and a second electro-optical component which differs from the first electro-optical component, wherein the first and second electro-optical components include a beam source generating a laser beam and a detector detecting a reception beam;
- a first beam-shaping optical element and a second beam-shaping optical element which differs from the first beam-shaping optical element, wherein the first and second beam-shaping optical elements shape the laser beam and the reception beam;
- a monolithic optics carrier including a first receptacle, wherein the first electro-optical component is mounted in the first receptacle, a second receptacle, wherein the first beam-shaping optical element is mounted in the second receptacle, and a third receptacle, wherein the second beam-shaping optical element is mounted in the third receptacle;
- wherein the first electro-optical component and/or the first beam-shaping optical element are only adjustable relative to the monolithic optics carrier in a direction of an associated respective optical axis of the first electro-optical component and/or the first beam-shaping optical element and wherein the second beam-shaping optical element is only adjustable relative to the monolithic optics carrier in a direction of an associated respective optical axis of the second beam-shaping optical element;
- a printed circuit board including a further receptacle, wherein the second electro-optical component is mounted in the further receptacle; and
- a connecting device, wherein the monolithic optics carrier is connectable to the printed circuit board by the connecting device;

and comprising the steps of:

adjusting the first electro-optical component and/or the first beam-shaping optical element relative to the monolithic optics carrier in the direction of the associated respective optical axis of the first electro-optical component and/or the first beam-shaping optical element;

adjusting the second beam-shaping optical element relative to the monolithic optics carrier in the direction of the associated respective optical axis of the second beam-shaping optical element;

abutting the printed circuit board against the monolithic optics carrier; and adjusting the second electro-optical component only in a plane essentially perpendicular to an associated optical axis of the second electro-optical component such that no gap develops between the printed circuit board and the second electro-optical component in a direction of the associated optical axis of the second electro-optical component and such that no solder bridge exists between the printed circuit board and the second electro-optical component.

* * * * *